United States Patent
Fujimura et al.

(10) Patent No.: US 9,500,926 B2
(45) Date of Patent: Nov. 22, 2016

(54) ELECTROCHROMIC DISPLAY ELEMENT AND IMAGE DISPLAY DEVICE

(71) Applicants: Koh Fujimura, Tokyo (JP); Tohru Yashiro, Kanagawa (JP); (Continued)

(72) Inventors: Koh Fujimura, Tokyo (JP); Tohru Yashiro, Kanagawa (JP); (Continued)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/772,632

(22) PCT Filed: Jan. 16, 2014

(86) PCT No.: PCT/JP2014/051315
§ 371 (c)(1),
(2) Date: Sep. 3, 2015

(87) PCT Pub. No.: WO2014/141748
PCT Pub. Date: Sep. 18, 2014

(65) Prior Publication Data
US 2015/0378233 A1  Dec. 31, 2015

(30) Foreign Application Priority Data
Mar. 14, 2013 (JP) ................................. 2013-052472

(51) Int. Cl.
*G02F 1/155* (2006.01)
*G02F 1/15* (2006.01)
*G02F 1/153* (2006.01)

(52) U.S. Cl.
CPC ............ *G02F 1/155* (2013.01); *G02F 1/1525* (2013.01); *G02F 2001/1536* (2013.01); *G02F 2001/1552* (2013.01)

(58) Field of Classification Search
CPC ....................................................... G02F 1/155
(Continued)

(56) References Cited

U.S. PATENT DOCUMENTS 6,301,038 B1  10/2001  Fitzmaurice et al.
6,882,459 B2   4/2005  Fujishima et al.
(Continued)

FOREIGN PATENT DOCUMENTS

JP  2001-510590  7/2001
JP  2002-287171  10/2002
(Continued)

OTHER PUBLICATIONS

Feb. 11, 2016 European search report in connection with European Patent Application No. 14764202.9.
(Continued)

*Primary Examiner* — James Jones
(74) *Attorney, Agent, or Firm* — Cooper & Dunham LLP

(57) ABSTRACT

Disclosed is an electrochromic display element, including a display substrate, a display electrode, an electrochromic layer, an opposed electrode, and an opposed substrate, wherein the electrochromic layer is formed on the display electrode, a liquid crystal composition that includes a low-molecular liquid crystal and an ionic liquid is present between the display electrode and the opposed electrode, and the ionic liquid includes a tetracyanoboric acid ion and/or tris(pentafluoroethyl)trifluorophosphoric acid ion as an anionic component.

8 Claims, 3 Drawing Sheets

(71) Applicants: Shigenobu Hirano, Kanagawa (JP);
Hiroyuki Takahashi, Kanagawa (JP);
Yoshinori Okada, Kanagawa (JP);
Yoshihisa Naijo, Kanagawa (JP);
Kazuaki Tsuji, Kanagawa (JP);
Sukchan Kim, Kanagawa (JP);
Keiichiroh Yutani, Kanagawa (JP)

(72) Inventors: Shigenobu Hirano, Kanagawa (JP);
Hiroyuki Takahashi, Kanagawa (JP);
Yoshinori Okada, Kanagawa (JP);
Yoshihisa Naijo, Kanagawa (JP);
Kazuaki Tsuji, Kanagawa (JP);
Sukchan Kim, Kanagawa (JP);
Keiichiroh Yutani, Kanagawa (JP)

(58) Field of Classification Search
USPC .................................................... 359/266
See application file for complete search history.

(56) References Cited

U.S. PATENT DOCUMENTS

| | | |
|---|---|---|
| 7,333,259 B2 | 2/2008 | Hirano et al. |
| 7,639,415 B2 | 12/2009 | Jung et al. |
| 8,384,983 B2 | 2/2013 | Yashiro et al. |
| 8,531,754 B2 | 9/2013 | Fujimura et al. |
| 8,736,941 B2 | 5/2014 | Naijo et al. |
| 8,902,151 B2 | 12/2014 | Yashiro et al. |
| 8,937,758 B2 | 1/2015 | Kim et al. |
| 2008/0310007 A1 | 12/2008 | Agrawal et al. |
| 2010/0229950 A1 | 9/2010 | Kuang et al. |
| 2011/0279884 A1 | 11/2011 | Fujimura et al. |
| 2012/0050838 A1 | 3/2012 | Hirano et al. |
| 2012/0154892 A1* | 6/2012 | Yashiro ............... G02F 1/1525 359/270 |
| 2013/0250394 A1 | 9/2013 | Okada et al. |
| 2013/0258439 A1 | 10/2013 | Naijo et al. |

FOREIGN PATENT DOCUMENTS

| | | |
|---|---|---|
| JP | 2003-121883 | 4/2003 |
| JP | 2006-058618 | 3/2006 |
| JP | 2006-106669 | 4/2006 |
| JP | 2006-323022 | 11/2006 |
| JP | 2007-171781 | 7/2007 |
| JP | 2007-194150 | 8/2007 |
| JP | 2008-116718 | 5/2008 |
| JP | 2008-304906 | 12/2008 |
| JP | 2009-069480 | 4/2009 |
| JP | 2009-527074 | 7/2009 |
| JP | 2010-033016 | 2/2010 |
| JP | 2012-123055 | 6/2012 |
| JP | 2012-141584 | 7/2012 |
| WO | WO 2006/123810 A1 | 11/2006 |

OTHER PUBLICATIONS

International Search Report Issued on Mar. 18, 2014 in PCT/JP2014/051315 filed on Jan. 16, 2014.

Okada et al., "High Resolution Technology for Multi-Layered Electrochromic Display", IDW/AD '12 proceedings of the International Display Workshops, vol. 19 (Day1-2), EP3-2, pp. 641-644, Dec. 3, 2012.

Okano et al., "Liquid Crystal Materials", Liquid Crystal basic edition/Application edition, Baifukan Co., Ltd., pp. 178-204, 1985 (with English translation).

* cited by examiner and image display device.

BACKGROUND ART

Conventionally, an electrochromic display element has been known that utilizes coloration and discoloration of an electrochromic compound. The study and development of an electrochromic display element is being conducted widely as a major candidate of a display element for an electronic paper.

Furthermore, an electrochromic display element is anticipated for a multicolor display device because it is possible to develop various colors due to structures of an electrochromic compound.

However, there is a problem that image blur caused by a passage of time is generated between a display electrode and an opposed electrode.

Japanese Patent Application Publication No. 2012-123055 discloses an electrochromic display element that has a display substrate, a display electrode, an opposed substrate, an opposed electrode, an electrochromic layer provided to contact a face of the display electrode at a side of the opposed electrode, and an electrolyte layer provided to be interposed between the display electrode and the opposed electrode. Herein, the electrolyte layer contains a molecular liquid crystal compound, a salt with a counter anion which is a hexafluorophosphoric ion or the like, and a solvent.

However, it is desired that a retention property is further improved.

SUMMARY OF THE INVENTION

According to one aspect of the present invention, there is provided an electrochromic display element, including a display substrate, a display electrode, an electrochromic layer, an opposed electrode, and an opposed substrate, wherein the electrochromic layer is formed on the display electrode, a liquid crystal composition that includes a low-molecular liquid crystal and an ionic liquid is present between the display electrode and the opposed electrode, and the ionic liquid includes a tetracyanoboric acid ion and/or tris(pentafluoroethyl)trifluorophosphoric acid ion as an anionic component.

According to another aspect of the present invention, there is provided an image display device including the electrochromic display element as described above.

Figure 1:
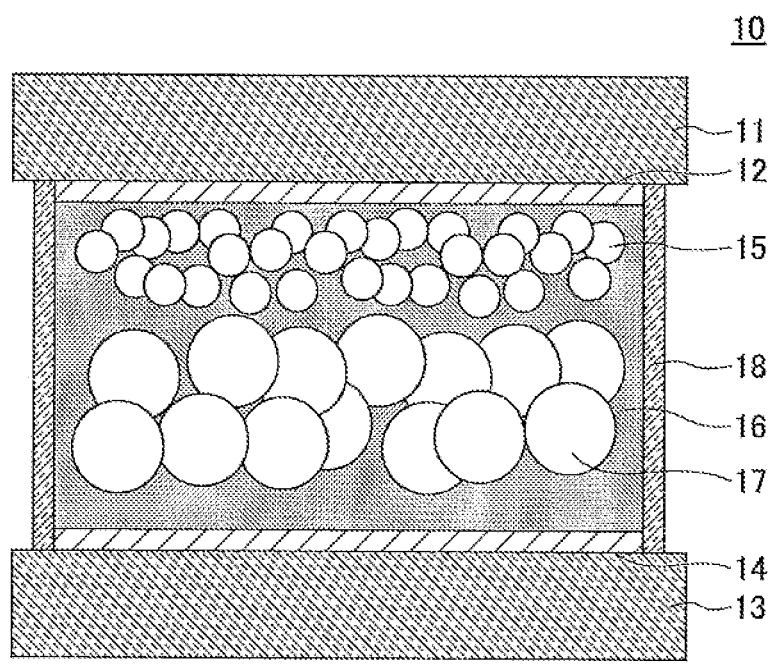
FIG. 1 is a cross-sectional view that illustrates one example of an electrochromic display element.

EXPLANATION OF LETTERS OR NUMERALS 10, 20 electrochromic display element
11 display substrate
12, 12A, 12B display electrode
13 opposed substrate
14 opposed electrode
15, 15A, 15B electrochromic layer
16 liquid crystal composition
17 white color reflection layer
21 insulation layer

EMBODIMENTS FOR IMPLEMENTING THE INVENTION

Next, an embodiment for implementing the present invention will be described.

FIG. 1 illustrates one example of an electrochromic display element.

An electrochromic display element 10 has a display substrate 11, a display electrode 12 formed on the display substrate 11, an opposed substrate 13, an opposed electrode 14 formed on the opposed substrate 13, and an electrochromic layer 15 formed on the display electrode 12. Furthermore, a liquid crystal composition 16 that includes a low-molecular liquid crystal and an ionic liquid is present between the display electrode 12 and the opposed electrode 14. Herein, an ionic liquid includes a tetracyanoboric acid ion ($[B(CN)_4]^-$) and/or tris(pentafluoroethyl) trifluorophosphoric acid ion ($[PF_3(CF_2CF_3)_3]^-$) as an anionic component. Moreover, a white color reflection layer 17 is formed on the electrochromic layer 15. Furthermore, the display substrate 11 and the opposed substrate 13 are bonded via a spacer 18.

As a driving voltage is applied between the display electrode 12 and the opposed electrode 14 in the electrochromic display element 10 in order to color or discolor the electrochromic layer 15, it is possible to obtain a good response characteristic. It is considered that this is because the liquid crystal composition 16 is oriented into a direction of electric field so that it is possible for an ion included in an ionic liquid to move readily between the display electrode 12 and the opposed electrode 14.

It is possible to suppress generation of image blur caused by a passage of time because the liquid crystal composition 16 includes a low-molecular liquid crystal and an ionic liquid. It is considered that this is because it is possible to suppress diffusion of an ion included in an ionic liquid due to a viscosity and an orientation of the liquid crystal composition 16.

Furthermore, it is possible to form the liquid crystal composition 16 even if an organic solvent is not included therein, because a tetracyanoboric acid ion or a tris(pentafluoroethyl)trifluorophosphoric acid ion that is included in an ionic liquid has a high affinity with a low-molecular liquid crystal, and as a result, it is possible to improve a retention property.

Here, the liquid crystal composition 16 may include an organic solvent according to need as long as a retention property is not affected adversely.

Although an organic solvent is not particularly limited, it is possible to provide a propylene carbonate, an acetonitrile, α-butyrolactone, an ethylene carbonate, a butylene carbonate, a sulfolane, a dioxolane, a tetrahydrofuran, a 2-methyltetrahydrofuran, a dimethyl sulfoxide, a 1,2-dimethoxyethane, a 1,2-ethoxymethoxyethane, an ethylene glycol, an alcohol, or the like.

Moreover, it is possible to manufacture the liquid crystal composition 16 by vacuum degassing a composition that includes a low-molecular liquid crystal and an ionic liquid to eliminate a gas such as air and moisture, because vapor pressures of a low-molecular liquid crystal and an ionic liquid are low. Thereby, it is possible to suppress generation of an air bubble and degradation of an electrode that are caused by repeated driving of the electrochromic display element 10.

The liquid crystal composition 16 is in a liquid crystal state at a driving temperature for the electrochromic display element 10 and is oriented by a driving voltage for the electrochromic display element 10.

For a low-molecular liquid crystal, it is possible to use a publicly-known material (see, for example, Liquid Crystal Basic edition/Application edition, jointly-edited by Okano and Kobayashi, BAIFUKAN CO., LTD.).

Because the liquid crystal composition 16 is vertically oriented between the display electrode 12 and the opposed electrode 14 in a case where a driving voltage is applied between the display electrode 12 and the opposed electrode 14, it is preferable to be a nematic liquid crystal that has a positive dielectric anisotropy.

It is preferable for a low-molecular liquid crystal to be a compound represented by a general formula of:

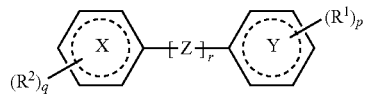

(in the formula, $R^1$ is an alkyl group with a carbon number of 1-20 that may have a substituent, an aryl group with a carbon number of 1-20 that may have a substituent, an alkoxy group with a carbon number of 1-20 that may have a substituent, a halo group, or a hydrogen atom, p is an integer of 1-5, in a case where p is greater than or equal to 2, a plurality of $R^1$ may be identical or different, $R^2$ is a cyano group, a halo group, or a hydrogen atom, q is an integer of 1-5, in a case where q is greater than or equal to 2, a plurality of $R^2$ may be identical or different, Z is a carbonyloxy group or an alkylene group with a carbon number of 1-6, r is an integer of 0-2, each of X and Y is independently an aliphatic monocyclic hydrocarbon group, a hetero-monocyclic group, a fused-polycyclic hydrocarbon group, or a fused-heterocyclic group.).

It is preferable for a dielectric anisotropy of a low-molecular liquid crystal to be greater than or equal to 10. Thereby, it is possible to improve an affinity with an ion included in an ionic liquid.

It is preferable for a molecular weight of a low-molecular liquid crystal to be less than or equal to 1000. Thereby, it is possible to improve an affinity with an ion included in an ionic liquid.

It is preferable for an ionic liquid to include one kind or more than one kind selected from a group composed of an imidazolium ion, an N-methylpyrrolidinium ion, and an ammonium ion, as a cationic component. Thereby, it is possible to improve an affinity with a low-molecular liquid crystal.

Here, an ionic liquid other than one described above may be used in combination according to need, as long as a retention property is not affected adversely.

A content of an ionic liquid in the liquid crystal composition 16 is usually 0.2-10% by mass, wherein it is preferable to be 0.2-5% by mass. If a content of an ionic liquid in the liquid crystal composition 16 is less than 0.2% by mass, a response characteristic of coloration and discoloration may be degraded, and if more than 10% by mass is provided, image blur caused by a passage of time may be generated and a retention property may be degraded.

The liquid crystal composition 16 may further include a curable resin. Thereby, it is possible to improve a strength of the electrochromic display element 10.

It is possible to form such a liquid crystal composition 16 by filling a composition that includes a photosetting resin (or thermosetting resin), a low-molecular liquid crystal and an ionic liquid between the display electrode 12 and the opposed electrode 14 and subsequently conducting photosetting (or thermosetting) thereof.

A distance between the display electrode 12 and the opposed electrode 14 is usually 0.1-200 wherein it is preferable to be 1-50 μm. If a distance between the display electrode 12 and the opposed electrode 14 is less than 0.1 μm, it may be difficult to manufacture the electrochromic display element 10, and if more than 200 μm is provided, image blur caused by a passage of time may readily be generated.

The display substrate 11 supports the display electrode 12.

Although the display substrate 11 is not particularly limited as long as a transparent one is provided, it is possible to provide a glass substrate, a plastic film, or the like.

The display electrode 12 controls an electric potential of the display electrode 12 with respect to the opposed electrode 14, and colors or discolors the electrochromic layer 15.

Although a material for composing the display electrode 12 is not particularly limited as long as one that has an electrical conductivity and is transparent is provided, it is possible to provide an indium tin oxide (ITO), a fluorine-doped tin oxide (FTO), an antimony-doped tin oxide (ATO), a gallium zinc oxide (GaZnO), a tin oxide ($SnO_2$), an indium oxide ($In_2O_3$), a zinc oxide (ZnO), or the like. Among these, an indium tin oxide (ITO), a gallium zinc oxide (GaZnO), a tin oxide ($SnO_2$), an indium oxide ($In_2O_3$), or a zinc oxide (ZnO) is preferable, because it is possible to form the display electrode 12 by a sputtering method.

Here, if the display electrode 12 is provided between the display substrate 11 and the opposed electrode 14, formation thereof may not be conducted on the display substrate 11. In such a case, the liquid crystal composition 16 is present between the display substrate 11 and the opposed electrode 14.

The opposed substrate 13 supports the opposed electrode 14.

Although the opposed substrate 13 is not particularly limited, it is possible to provide a glass substrate, a plastic film, or the like.

The opposed electrode 14 controls an electric potential of the display electrode 12 with respect to the opposed electrode 14, and colors or discolors the electrochromic layer 15. Herein, the opposed electrode 14 may be formed on an entire area that is opposed to the display electrode 12 or may be patterned and formed on an area that is opposed to the display electrode 12. Although the opposed electrode 14 that is opposed to the display electrode 12 and is patterned and formed is not particularly limited, it is possible to provide an opposed electrode with rectangular picture element electrodes formed to be separated at a predetermined interval, or the like.

Although a material for composing the opposed electrode 14 is not particularly limited as long as one that has an electrical conductivity is provided, it is possible to provide a transparent electrically conductive material such as an indium tin oxide (ITO), a fluorine-doped tin oxide (FTO), or a zinc oxide (ZnO); an electrically conductive material such as a zinc, a platinum, or a carbon; or the like.

Here, in a case where a metal plate of a zinc or the like is used for the opposed electrode 14, the opposed electrode 14 doubles as the opposed substrate 13.

The electrochromic layer 15 includes an electrochromic material.

Although an electrochromic material is not particularly limited, it is possible to use an inorganic electrochromic compound, an organic electrochromic compound, an electrically conductive polymer, or the like.

For an inorganic electrochromic compound, it is possible to provide a titanium oxide, a vanadium oxide, a tungsten oxide, an indium oxide, an iridium oxide, a nickel oxide, Prussian blue, or the like.

For an organic electrochromic compound, it is possible to provide an azobenzene-type compound, an anthraquinone-type compound, a diarylethane-type compound, a dihydroprene-type compound, dipyridine-type compound, a styryl-type compound, a styrylspiropyran-type compound, a spirooxadine-type compound, a spirothiopyran-type compound, a thioindigo-type compound, a tetrathiafulvalene-type compound, a terephthalic acid-type compound, a triphenylmethane-type compound, a triphenylamine-type compound, a naphthopyran-type compound, a viologen-type compound, a pyrazoline-type compound, a phenazine-type compound, a phenylenedimaine-type compound, a phenoxadine-type compound, a phenothiazine-type compound, a phthalocyaine-type compound, a fluoran-type compound, a fulgide-type compound, a benzopyran-type compound, a metallocene-type compound, or the like. Among these, a viologen-type compound (see, for example, Japanese Patent Application Publication No. 2001-510590 or Japanese Patent Application Publication No. 2007-171781) or a dipyridine-type compound (see, for example, Japanese Patent Application Publication No. 2007-171781 or Japanese Patent Application Publication No. 2008-116718) is preferable, because a coloration or discoloration electric potential is low and a good color value is exhibited.

For an electrically conductive polymer, it is possible to provide a polypyrrole, a polythiophene, a polyaniline, or the like.

It is preferable for the electrochromic layer 15 to include an electrically conductive or semiconductive particle with an organic electrochromic compound carried thereon. Thereby, it is possible to improve a response characteristic of coloration or discoloration and a white color reflectivity.

It is possible to form such an electrochromic layer 15 by sintering an electrically conductive or semiconductive particle for a surface of the display electrode 12 and subsequently adsorbing an organic electrochromic compound that has a polar group onto a surface of the electrically conductive or semiconductive particle.

Although a material for composing an electrically conductive or semiconductive particle is not particularly limited, it is possible to provide a titanium oxide, a zinc oxide, a tin oxide, a zirconium oxide, a cerium oxide, an yttrium oxide, a boron oxide, a magnesium oxide, a strontium titanate, a potassium titanate, a barium titanate, a calcium titanate, a calcium oxide, a ferrite, a hafnium oxide, a tungsten oxide, an iron oxide, a copper oxide, a nickel oxide, a cobalt oxide, a barium oxide, a strontium oxide, a vanadium oxide, an aluminosilicic acid, a calcium phosphate, an aluminosilicate, or the like, and two or more kinds thereof may be used in combination. Among these, a titanium oxide, a zinc oxide, a tin oxide, a zirconium oxide, an iron oxide, a magnesium oxide, an indium oxide, or a tungsten oxide is preferable because a response characteristic of coloration or discoloration thereof is excellent, wherein a titanium oxide is more preferable.

An electrically conductive or semiconductive particle is usually a nano-particle with a particle size of about 5-50 nm. Because a nano-particle has a large specific surface area, it is possible to adsorb an organic electrochromic compound efficiently and it is possible to improve a display contrast ratio of coloration or discoloration.

Although a polar group possessed by an organic electrochromic compound is not particularly limited, it is possible to provide a phosphonic acid group, a carboxyl group, a silanol group, or the like.

Here, a plurality of kinds of organic electrochromic compounds may be adsorbed onto an electrically conductive or semiconductive particle.

A thickness of the electrochromic layer 15 is usually 0.2-5 If a thickness of the electrochromic layer 15 is less than 0.2 µm, a coloration density may be lowered, and if more than 5 is provided, a manufacturing cost may be increased and a visibility may be degraded.

The white color reflection layer 17 is formed to improve a white color reflectivity.

It is possible to form the white color reflection layer 17 by applying a resin solution with a white pigment particle dispersed therein onto the electrochromic layer 15.

Although a material for composing a white pigment particle is not particularly limited, it is possible to provide a metal oxide such as a titanium oxide, an aluminum oxide, a zinc oxide, a silicon oxide, a cesium oxide, or a yttrium oxide.

A ratio of a mass of a white pigment particle to a total mass of the liquid crystal composition 16 and the white pigment particle is usually 0.1-0.5.

Here, the white color reflection layer 17 may be formed on the opposed electrode 14 or a white pigment particle may be dispersed in the liquid crystal composition 16 instead of forming the white color reflection layer 17.

An electrical charge retention layer with a surface resistance that is greater than or equal to $1 \times 10^6 \Omega/\square$ may be formed on the opposed electrode 14. It is possible for an electrical charge retention layer to act as a buffer in a charge transfer between the display electrode 12 and the opposed electrode 14 so as to reduce a voltage applied between the display electrode 12 and the opposed electrode 14.

An electrical charge retention layer includes an electrically conductive or semiconductive particle and a polymer.

Although a material for composing an electrically conductive particle is not particularly limited, it is possible to provide an ITO, an FTO, an ATO, or the like.

Although a semiconductive particle is not particularly limited, it is possible to provide a titanium oxide, a zirconium oxide, a hafnium oxide, a chromium oxide, a molybdenum oxide, a tungsten oxide, a vanadium oxide, a niobium oxide, a tantalum oxide, a silver oxide, a zinc oxide, a strontium oxide, an iron oxide, a nickel oxide, or the like.

Although a polymer is not particularly limited, it is possible to provide an acryl-type resin, an alkyd-type resin, a fluorine-containing resin, an isocyanate-type resin, an urethane-type resin, an amino-type resin, an epoxy-type resin, a phenol-type resin, or the like.

It is possible to form an electrical charge retention layer by applying an application fluid that includes an electrically conductive or semiconductive particle and a polymer onto the opposed electrode 14. In this case, it is unnecessary to selectively apply an application fluid only onto the opposed electrode 14 and the application fluid may be applied onto an area on the opposed substrate 13 wherein the opposed electrode 14 is not formed. Thereby, it is possible to improve workability in manufacturing the electrochromic display element 10 and suppress an increase of a manufacturing cost with respect to a case where an electrical charge retention layer is not formed.

Although a method for applying an application fluid is not particularly limited, it is possible to provide a spin coating method, a blade coating method, or the like.

Figure 2:
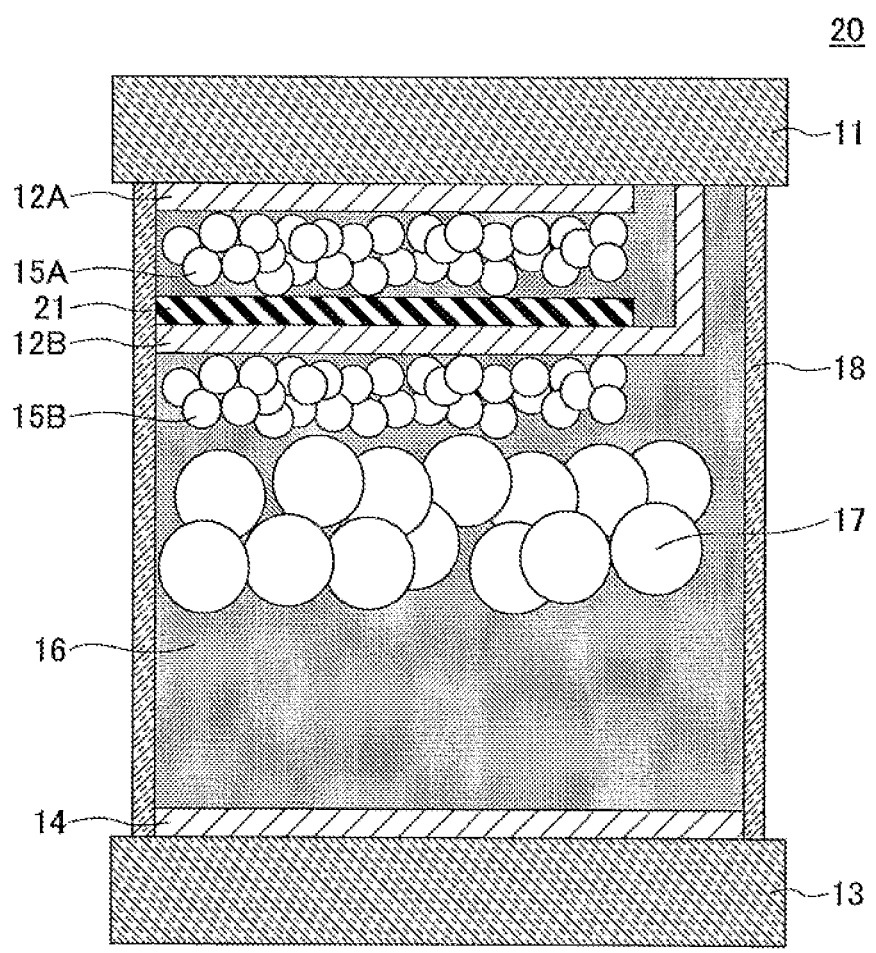
FIG. 2 is a cross-sectional view that illustrates another example of an electrochromic display element.

FIG. 2 illustrates another example of an electrochromic display element.

An electrochromic display element 20 has a configuration identical to that of the electrochromic display element 10 except that a display electrode 12A, an electrochromic layer 15A, an insulation layer 21, a display electrode 12B, and an electrochromic layer 15B are sequentially laminated on the display substrate 11.

The display electrode 12A controls an electric potential of the display electrode 12A with respect to the opposed electrode 14 and colors or discolors the electrochromic layer 15A.

Furthermore, the display electrode 12B controls an electric potential of the display electrode 12B with respect to the opposed electrode 14 and colors or discolors the electrochromic layer 15B.

An electrical resistance between the display electrode 12A and the display electrode 12B is greater than an electrical resistance of the display electrode 12A and the display electrode 12B, wherein it is preferable to be greater than or equal to 500 times as much as an electrical resistance of the display electrode 12A and the display electrode 12B. Thereby, it is possible to control an electric potential with respect to the opposed electrode 14 independently.

It is preferable for all electrochromic materials included in the electrochromic layers 15A and 15B to be viologen-type compound(s) or terephthalic acid-type compound(s). Thereby, it is possible to uniform electric potentials for coloration or discoloration and control coloration or discoloration readily.

Here, the electrochromic layer 15B may be formed at a side of the display electrode 12B that is not opposed to the opposed electrode 14.

The insulation layer 21 is a porous film formed to isolate the display electrode 12A with the electrochromic layer 15A formed thereon and the display electrode 12B with the electrochromic layer 15B formed thereon. Therefore, it is possible to improve a response characteristic for coloration or discoloration. Here, it is possible to form a porous film as a particle film.

Because the insulation layer 21 is excellent in an insulation property, durability, and a film formation property, it is preferable to include a zinc sulfide (ZnS).

A content of a zinc sulfide in the insulation layer 21 is usually 50-90 mol % from the view point of a crystallinity thereof.

It is possible to form a film of a zinc sulfide by a sputtering method and it is possible to suppress damage to the electrochromic layer 15A.

Although a material for composing the insulation layer 21 is not particularly limited, it is possible to provide a ZnS—$SiO_2$, a ZnS—SiC, a ZnS—Si, a ZnS—Ge, or the like. Among these, a ZnS—$SiO_2$ (molar ratio 8:2), a ZnS—$SiO_2$ (molar ratio 7:3), a ZnS, or a ZnS—ZnO—$In_2O_3$—$Ga_2O_3$ (molar ratio 60:23:10:7) is preferable.

In a case where a film of a zinc sulfide is formed by a sputtering method, it is possible to form a porous film by forming a particle film preliminarily.

Although a material for composing a particle film is not particularly limited, it is possible to provide a silica, an alumina, or the like.

Here, a metal oxide included in a material for composing the insulation layer 21 may double as a material for composing a particle film.

A thickness of the insulation layer 21 is usually 20-500 nm, wherein it is preferable to be 50-150 nm. If a thickness of the insulation layer 21 is less than 20 nm, an electrical resistance between the display electrode 12A and the display electrode 12B may be small, and if more than 500 nm is provided, a cost increase may be caused and visibility may be degraded.

Here, although it is possible to control an electrical resistance between the display electrode 12A and the display electrode 12B by a thickness of the electrochromic layer 15A without forming the insulation layer 21, it is preferable to form the insulation layer 21 to conduct such a control.

Next, a multicolor display of the electrochromic display element 20 will be described.

The electrochromic display element 20 is provided in such a manner that the display electrode 12A with the electrochromic layer 15A formed thereon and the display electrode 12B with the electrochromic layer 15B formed thereon are isolated via the insulation layer 21. Therefore, it is possible to control an electric potential of the display electrode 12A with respect to the opposed electrode 14 and an electric potential of the display electrode 12B with respect to the opposed electrode 14 independently. As a result, it is possible to color or discolor the electrochromic layer 15A formed on the display electrode 12A and the electrochromic layer 15B formed on the display electrode 12B independently.

Therefore, it is possible for the electrochromic display element 20 to change a color thereof in three steps in which there is coloration of the electrochromic layer 15A, coloration of the electrochromic layer 15B, and coloration of the electrochromic layer 15A and the electrochromic layer 15B, and thereby, a multicolor display is possible.

It is possible to apply an electrochromic display element to an image display device such as an electronic paper.

Although the present invention will be described more specifically below by providing practical examples and comparative examples, the present invention is not limited to these practical examples. Here, a part means a part by mass.

Practical Example 1

[Fabrication of an Electrochromic Display Element]

1.0 part of 1-ethyl-3-methylimidazolium tetracyanoborate (EMIM TCB) as an ionic liquid and 99.0 parts of MLC-6650 (produced by Merck KGaA) as a nematic liquid crystal were mixed to obtain a liquid crystal composition 16.

An ITO film with a thickness of 100 nm (a display electrode 12) was formed on an entire surface of a glass substrate with a length of 40 mm, a breadth of 40 mm, and a thickness of 0.7 mm (a display substrate 11) by a sputtering method. An electrical resistance of the display electrode 12 between end portions thereof was 200Ω.

After a titanium oxide nano-particle dispersion fluid SP210 (produced by SHOWA TITANIUM COMPANY) was applied onto the display electrode 12 by a spin coating method, an anneal process was conducted at 120° C. for 15 minutes to form a titanium oxide particle film. Moreover, after a 1.5% by mass solution of a dipyridine-type compound represented by a chemical formula of:

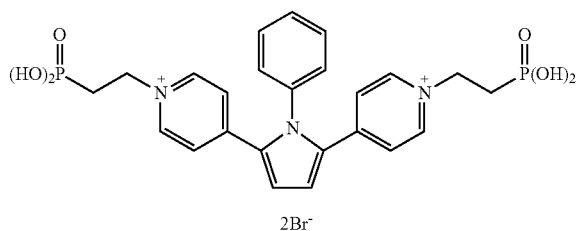

as an electrochromic compound in 2,2,3,3-tetrafluoropropanol was applied onto the titanium oxide particle film by a spin coating method, an anneal process was conducted at 120° C. for 10 minutes to form the electrochromic layer 15.

After 90 parts of 2,2,3,3-tetrafluoro-1-propanol and 10 parts of an urethane paste HW140SF (produced by DIC CORPORATION) were mixed, 100 parts of titanium oxide particles with an average particle size of 250 nm CR90 (produced by ISHIHARA SANGYO KAISHA, LTD.) were dispersed therein to obtain a paste. Then, after the paste was applied onto the electrochromic layer 15 by a spin coating method, an anneal process was conducted at 120° C. for 5 minutes to form a white color reflection layer 17 with a thickness of 1

An ITO pattern film (an opposed electrode 14) was formed on a glass substrate with a length of 32 mm, a breadth of 40 mm, and a thickness of 0.7 mm (an opposed substrate 13) by a sputtering method, in such a manner that six rectangular picture element electrodes with a length of 4 mm, a breadth of 35 mm, and a thickness of 100 nm were formed at an interval of 1 mm.

After 100 parts of 2,2,3,3-tetrafluoro-1-propanol and 5.4 parts of an urethane paste HW140SF (produced by DIC CORPORATION) were mixed, 5.0 parts of ATO nanoparticles (produced by MITSUBISHI MATERIALS CORPORATION) were dispersed therein to obtain a paste. Then, after the paste was applied onto the opposed substrate 13 with the opposed electrode 14 formed thereon by a spin coating method, an anneal process was conducted at 120° C. for 15 minutes to form an electrical charge retention layer with a thickness of 0.64 μm and a surface resistance of $1\times10^6 \Omega/\square$.

Figure 3:
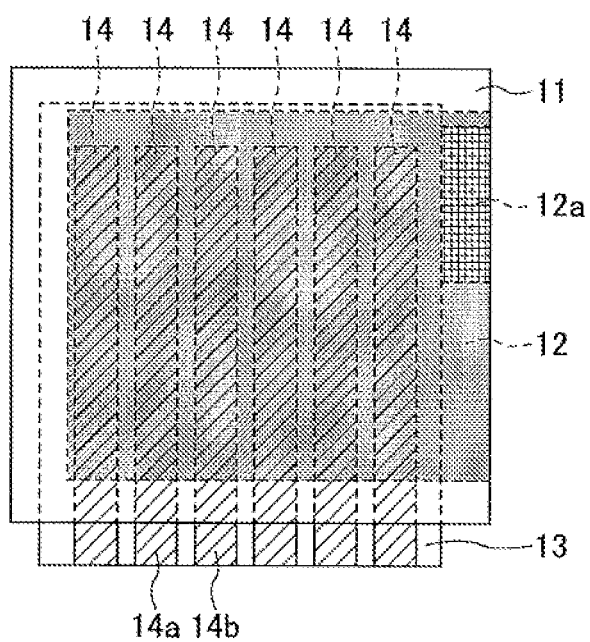
FIG. 3 is a top view that illustrates a configuration of electrodes for an electrochromic display element in Practical Example 1.

After the liquid crystal composition 16 was dropped onto the display substrate 11 with the display electrode 12, the electrochromic layer 15, and the white color reflection layer 17 formed thereon, the opposed substrate 13 with the opposed electrode 14 and the electrical charge retention layer formed thereon was bonded thereto via a spacer 18 to an electrochromic display element 10 (see FIG. 1 and FIG. 3).

[Coloration and Discoloration]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.0 V was applied thereto for 1 second, the electrochromic layer 15 provided magenta coloration in accordance with shapes of the picture element electrodes 14a and 14b. Then, as a voltage of −3.0V was applied thereto for 1 second, complete discoloration was provided to return to a white color. From the above precedings, it was possible to confirm a sufficient responsiveness of coloration and discoloration.

[White Color Reflectivity]

As a white color reflectivity of the electrochromic display element 10 at a discoloration state was measured at a side of the display substrate 11 by using a spectral colorimeter LCD-5000 (produced by OTSUKA ELECTRONICS CO. LTD.), 50% was provided. [Image blur and Retention property]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.0 V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 20% and it was possible to confirm a sufficient retention property. Furthermore, magenta was not spread to a non-coloration part and image blur caused by a passage of time was not generated.

Practical Example 2

An electrochromic display element 10 was obtained similarly to Practical Example 1 except that BL-048 (produced by Merck KGaA) was used as a nematic liquid crystal.

[Coloration and Discoloration]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.0 V was applied thereto for 1 second, the electrochromic layer 15 provided magenta coloration in accordance with shapes of the picture element electrodes 14a and 14b. Then, as a voltage of −3.0 V was applied thereto for 1 second, complete discoloration was provided to return to a white color. From the above precedings, it was possible to confirm a sufficient responsiveness of coloration and discoloration.

[White Color Reflectivity]

As a white color reflectivity of the electrochromic display element 10 at a discoloration state was measured at a side of the display substrate 11 by using a spectral colorimeter LCD-5000—(produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.0V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 20% and it was possible to confirm a sufficient retention property. Furthermore, magenta was not spread to a non-coloration part and image blur caused by a passage of time was not generated.

Practical Example 3

[Fabrication of an Electrochromic Display Element]

2.2 parts of 1-butyl-1-methylpyrrolidinium tetracyanoborate (BMPL TCB) as an ionic liquid and 97.8 parts of MLC-6650 (produced by Merck KGaA) as a nematic liquid crystal were mixed to obtain a liquid crystal composition 16.

An electrochromic display element 10 was obtained similarly to Practical Example 1 except that the obtained liquid crystal composition 16 was used.

[Coloration and Discoloration]

After a negative electrode and a positive electrode were connected to a driving connection portion 12a of the display electrode 12 and picture element electrodes 14a and 14b of the opposed electrode 14 in the electrochromic display element 10, respectively, and as a voltage of 2.5V was applied thereto for 1 second, the electrochromic layer 15 provided magenta coloration in accordance with shapes of the picture element electrodes 14a and 14b. Then, as a voltage of −2.5V was applied thereto for 1.5 seconds, complete discoloration was provided to return to a white color. From the above precedings, it was possible to confirm a sufficient responsiveness of coloration and discoloration.

[White Color Reflectivity]

As a white color reflectivity of the electrochromic display element 10 at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element 10, respectively, and as a voltage of 2.5V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 30% and it was possible to confirm a sufficient retention property. Furthermore, magenta was not spread to a non-coloration part and image blur caused by a passage of time was not generated.

Practical Example 4

[Fabrication of an Electrochromic Display Element]

4.8 parts of ethyldimethyl-(2-methoxyethyl)ammonium tris(pentafluoroethyl)trifluorophosphate (MOEDEA FAP) as an ionic liquid and 95.2 parts of MLC-6650 (produced by Merck KGaA) as a nematic liquid crystal were mixed to obtain a liquid crystal composition 16.

An electrochromic display element 10 was obtained similarly to Practical Example 1 except that the obtained liquid crystal composition 16 was used.

[Coloration and Discoloration]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.5V was applied thereto for 2 seconds, the electrochromic layer 15 provided magenta coloration in accordance with shapes of the picture element electrodes 14a and 14b. Then, as a voltage of −3.5V was applied thereto for 2 seconds, complete discoloration was provided to return to a white color. From the above precedings, it was possible to confirm a sufficient responsiveness of coloration and discoloration.

[White Color Reflectivity]

As a white color reflectivity of the electrochromic display element 10 at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.5V was applied thereto for 2 seconds, the electrochromic layer 15 provided magenta coloration in accordance with shapes of the picture element electrodes 14a and 14b. Then, as waiting for 30 minutes was conducted without applying a voltage, a damping rate of a coloration density was 20% and it was possible to confirm a sufficient retention property. Furthermore, magenta was not spread to a non-coloration part and image blur caused by a passage of time was not generated.

Practical Example 5

[Fabrication of an Electrochromic Display Element]

2.5 parts of 1-ethyl-3-methylimidazolium ammonium tris (pentafluoroethyl)trifluorophosphate (EMIM FAP) as an ionic liquid and 97.5 parts of MLC-6650 (produced by Merck KGaA) as a nematic liquid crystal were mixed to obtain a liquid crystal composition 16.

An electrochromic display element 10 was obtained similarly to Practical Example 1 except that the obtained liquid crystal composition 16 was used.

[Coloration and Discoloration]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.5V was applied thereto for 1 second, the electrochromic layer 15 provided magenta coloration in accordance with shapes of the picture element electrodes 14a and 14b. Then, as a voltage of −3.5V was applied thereto for 1 second, complete discoloration was provided to return to a white color. From the above precedings, it was possible to confirm a sufficient responsiveness of coloration and discoloration.

[White Color Reflectivity]

As a white color reflectivity of the electrochromic display element 10 at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element 10, respectively, and as a voltage of 3.5V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 25% and it was possible to confirm a sufficient retention property. Furthermore, magenta was not spread to a non-coloration part and image blur caused by a passage of time was not generated.

Comparative Example 1

[Fabrication of an Electrochromic Display Element]

1.0 part of tetrabutylammonium hexafluorophosphate (TBA PF6) as an electrolyte, 7 parts of butylene carbonate (BC), and 92 parts of BL-048 (produced by Merck KGaA) as a nematic liquid crystal were mixed to obtain a liquid crystal composition.

An electrochromic display element was obtained similarly to Practical Example 1 except that the obtained liquid crystal composition was used.

[Coloration and Discoloration]

After a negative electrode and a positive electrode were connected to a driving connection portion 12a of the display electrode 12 and picture element electrodes 14a and 14b of the opposed electrode 14 in the electrochromic display element, respectively, and as a voltage of 3V was applied thereto for 1 second, the electrochromic layer 15 provided magenta coloration in accordance with shapes of the picture element electrodes 14a and 14b. Then, as a voltage of −3V was applied thereto for 2 seconds, complete discoloration was provided to return to a white color. From the above precedings, it was possible to confirm a sufficient responsiveness of coloration and discoloration.

[White Color Reflectivity]

As a white color reflectivity of the electrochromic display element at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element, respectively, and as a voltage of 3V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 70% and it was not possible to confirm a sufficient retention property. Furthermore, magenta was not spread to a non-coloration part and image blur caused by a passage of time was not generated.

Comparative Example 2

[Fabrication of an Electrochromic Display Element]

0.9 parts of tetrabutylammonium tetrafluoroborate (TBABF4) as an electrolyte, 7.1 part of butylene carbonate (BC), and 92 parts of BL-048 (produced by Merck KGaA) as a nematic liquid crystal were mixed to obtain a liquid crystal composition.

An electrochromic display element was obtained similarly to Practical Example 1 except that the obtained liquid crystal composition was used.

[Coloration and Discoloration]

After a negative electrode and a positive electrode were connected to a driving connection portion 12a of the display electrode 12 and picture element electrodes 14a and 14b of the opposed electrode 14 in the electrochromic display element, respectively, and as a voltage of 5V was applied thereto for 1 second, the electrochromic layer 15 provided magenta coloration in accordance with shapes of the picture element electrodes 14a and 14b. Then, as a voltage of −5V was applied thereto for 2 seconds, complete discoloration was provided to return to a white color. From the above precedings, it was possible to confirm a sufficient responsiveness of coloration and discoloration.

[White Color Reflectivity]

As a white color reflectivity of the electrochromic display element at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to a driving connection portion 12a of the display electrode 12 and picture element electrodes 14a and 14b of the opposed electrode 14 in the electrochromic display element, respectively, and as a voltage of 5V was applied thereto for 1 second, the electrochromic layer 15 provided magenta coloration in accordance with shapes of the picture element electrodes 14a and 14b. Then, as waiting for 30 minutes was conducted without applying a voltage, a damping rate of a coloration density was 50% and it was not possible to confirm a sufficient retention property. Furthermore, magenta was spread to a non-coloration part and image blur caused by a passage of time was generated.

Table 1 illustrates evaluation results of image blur and retention properties of the electrochromic display elements in Practical Examples 1-5 and Comparative Examples 1 and 2.

TABLE 1

| | Liquid crystal composition | | | |
| --- | --- | --- | --- | --- |
| | Electrolyte | Content of electrolyte [% by mass] | Nematic liquid crystal | Organic solvent |
| Practical Example 1 | EMIM TCB | 1.0 | MLC-6650 | — |
| Practical Example 2 | EMIM TCB | 1.0 | BL-048 | — |
| Practical Example 3 | BMPL TCB | 2.2 | MLC-6650 | — |
| Practical Example 4 | MOEDEA FAP | 4.8 | MLC-6650 | — |
| Practical Example 5 | EMIM FAP | 2.5 | MLC-6650 | — |
| Comparative Example 1 | TBAPF6 | 1.0 | BL-048 | BC |
| Comparative Example 2 | TBABF4 | 0.9 | BL-048 | BC |

| | Retention property (damping rate of coloration density [%]) | Image blur |
| --- | --- | --- |
| Practical Example 1 | 20 | Absence |
| Practical Example 2 | 20 | Absence |
| Practical Example 3 | 30 | Absence |
| Practical Example 4 | 20 | Absence |
| Practical Example 5 | 25 | Absence |
| Comparative Example 1 | 70 | Absence |
| Comparative Example 2 | 50 | Presence |

From Table 1, it was found that it was possible for the electrochromic display elements 10 in Practical Examples 1-5 to be excellent in retention properties thereof and suppress generation of image blur caused by a passage of time.

On the other hand, because the electrochromic display elements in Comparative Examples 1 and 2 were such that the liquid crystal compositions include BC, retention properties thereof were degraded. Because the electrochromic display element in Comparative Example 2 was such that TBABF4 was used as an electrolyte, image blur caused by a passage of time was generated.

Practical Example 6

[Fabrication of an Electrochromic Display Element]

1.0 part of 1-ethyl-3-methylimidazolium tetracyanoborate (EMIM TCB) as an ionic liquid and 99.0 parts of MLC-6650 (produced by Merck KGaA) as a nematic liquid crystal were mixed to obtain a liquid crystal composition 16.

An ITO film with a length of 30 mm, a breadth of 25 mm, and a thickness of 100 nm (a display electrode 12A) was formed on a glass substrate with a length of 40 mm, a breadth of 40 mm, and a thickness of 0.7 mm (a display substrate 11) by a sputtering method. An electrical resistance of the display electrode 12A between end portions thereof was 200Ω.

After a titanium oxide nano-particle dispersion fluid SP210 (produced by SHOWA TITANIUM COMPANY) was applied onto the display electrode 12A by a spin coating method, an anneal process was conducted at 120° C. for 15 minutes to form a titanium oxide particle film. Then, after a 5% by mass solution of a viologen-type compound that was represented by a chemical formula of:

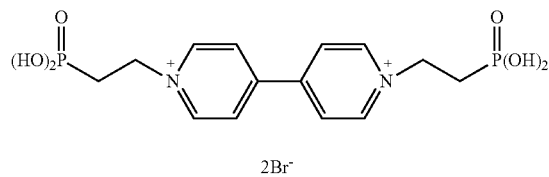

as an electrochromic compound in 2,2,3,3-tetrafluoropropanol was applied onto the titanium oxide particle film by a spin coating method, an anneal process was conducted at 120° C. for 10 minutes to form the electrochromic layer 15A.

A 0.1% by mass solution of poly(N-vinylamide) in ethanol and a 0.5% by mass aqueous solution of poly(vinyl alcohol) were sequentially applied onto the electrochromic layer 15A by a spin coating method to form a protection layer.

A ZnS—SiO$_2$ (molar ratio 8:2) film with a thickness of 25-150 nm (an insulation layer) was formed on the protection layer by a sputtering method. An ITO film with a length of 25 mm, a breadth of 25 mm, and a thickness of 100 nm (a display electrode 12B) was formed on the insulation layer by a sputtering method so as not to be superposed on the display electrode 12A. An electrical resistance of the display electrode 12B between end portions thereof was 200Ω.

After a titanium oxide nano-particle dispersion fluid SP210 (produced by SHOWA TITANIUM COMPANY) was applied onto the display electrode 12B by a spin coating method, an anneal process was conducted at 120° C. for 15 minutes to form a titanium oxide particle film. Then, after a 1% by mass solution of a viologen-type compound that was represented by a chemical formula of:

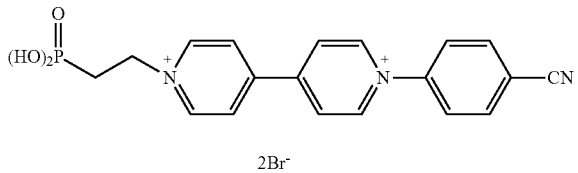

as an electrochromic compound in 2,2,3,3-tetrafluoropropanol was applied onto the titanium oxide particle film by a spin coating method, an anneal process was conducted at 120° C. for 10 minutes to form the electrochromic layer 15B.

After 90 parts of 2,2,3,3-tetrafluoro-1-propanol and 10 parts of an urethane paste HW140SF (produced by DIC CORPORATION) were mixed, 100 parts of titanium oxide particles with an average particle size of 250 nm CR90 (produced by ISHIHARA SANGYO KAISHA, LTD.) were dispersed therein to obtain a paste. Then, after the paste was applied onto the electrochromic layer 15 by a spin coating method, an anneal process was conducted at 120° C. for 5 minutes to form a white color reflection layer 17 with a thickness of 1

An ITO pattern film (an opposed electrode 14) was formed on a glass substrate with a length of 32 mm, a breadth of 40 mm, and a thickness of 0.7 mm (an opposed substrate 13) by a sputtering method, in such a manner that two rectangular picture element electrodes with a length of 4 mm, a breadth of 35 mm, and a thickness of 100 nm were formed at an interval of 1 mm. After 100 parts of 2,2,3,3-tetrafluoro-1-propanol and 5.4 parts of an urethane paste HW140SF (produced by DIC CORPORATION) were mixed, 5.0 parts of ATO nano-particles (produced by MITSUBISHI MATERIALS CORPORATION) were dispersed therein to obtain a paste. Then, after the paste was applied onto the opposed substrate 13 with the opposed electrode 14 formed thereon by a spin coating method, an anneal process was conducted at 120° C. for 15 minutes to form an electrical charge retention layer with a thickness of 0.64 μm and a surface resistance of $1 \times 10^6 \Omega/\square$.

After the liquid crystal composition 16 was dropped onto the display substrate 11 with the display electrode 12A, the electrochromic layer 15A, the protection layer, the insulation layer, the display electrode 12B, the electrochromic layer 15B, and the white color reflection layer 17 formed thereon, the opposed substrate 13 with the opposed electrode 14 and the electrical charge retention layer formed thereon were bonded thereto via a spacer 18 to an electrochromic display element 20 (see FIG. 2).

[Coloration and Discoloration]

After a negative electrode and a positive electrode were connected to the display electrode 12A and the two picture element electrodes of the opposed electrode 14 in the electrochromic display element 20, respectively, and as a voltage of 6V was applied thereto for 1 second, the electrochromic layer 15A provided blue coloration in accordance with shapes of the picture element electrodes. Then, as a voltage of −6V was applied thereto for 2 seconds, complete discoloration was provided to return to a white color.

After a negative electrode and a positive electrode were connected to the display electrode 12B and the two picture element electrodes of the opposed electrode 14 in the electrochromic display element 20, respectively, and as a voltage of 6V was applied thereto for 1 second, the electrochromic layer 15B provided green coloration in accordance with shapes of the picture element electrodes. Then, as a voltage of −6V was applied thereto for 2 seconds, complete discoloration was provided to return to a white color.

After a negative electrode and a positive electrode were connected to the display electrode 12A and the two picture element electrodes of the opposed electrode 14 in the electrochromic display element 20, respectively, and as a voltage of 6V was applied thereto for 1 second, the electrochromic layer 15A provided blue coloration in accordance with shapes of the picture element electrodes. Then, after a negative electrode and a positive electrode were connected to the display electrode 12B and the two picture element electrodes of the opposed electrode 14 in the electrochromic display element 20, respectively, and as a voltage of 6V was applied thereto for 1 second, the electrochromic layer 15B provided black coloration in accordance with shapes of the picture element electrodes. Moreover, as a voltage of −6V was applied thereto for 2 seconds, returning to a blue color was conducted. Then, after a negative electrode and a positive electrode were connected to the display electrode 12A and the two picture element electrodes of the opposed electrode 14 in the electrochromic display element 20, respectively, and as a voltage of −6V was applied thereto for 2 seconds, complete discoloration was provided to return to a white color.

From the above precedings, it was possible to confirm a sufficient responsiveness of coloration and discoloration.

[White color reflectivity]

As a white color reflectivity of the electrochromic display element 20 at a discoloration state was measured at a side of the display substrate 11 by using a spectral colorimeter LCD-5000 (produced by OTSUKA ELECTRONICS CO. LTD.), 50% was provided.

[Image Blur and Retention Property]

After a negative electrode and a positive electrode were connected to the display electrode 12A and two picture element electrodes of the opposed electrode 14 in the electrochromic display element 20, respectively, and as a voltage of 6V was applied thereto for 1 second, the electrochromic layer 15A provided blue coloration in accordance with shapes of the picture element electrodes. Then, as waiting for 30 minutes was conducted without applying a voltage, a damping rate of a coloration density was 30% and it was possible to confirm a sufficient retention property. Furthermore, blue was not spread to a non-coloration part and image blur caused by a passage of time was not generated.

After a negative electrode and a positive electrode were connected to the display electrode 12B and two picture element electrodes of the opposed electrode 14 in the electrochromic display element 20, respectively, and as a voltage of 6V was applied thereto for 1 second, the electrochromic layer 15B provided green coloration in accordance with shapes of the picture element electrodes. Then, as waiting for 30 minutes was conducted without applying a voltage, a damping rate of a coloration density was 40% and it was possible to confirm a sufficient retention property. Furthermore, green was not spread to a non-coloration part and image blur caused by a passage of time was not generated.

After a negative electrode and a positive electrode were connected to the display electrode 12A and two picture element electrodes of the opposed electrode 14 in the electrochromic display element 20, respectively, and as a voltage of 6V was applied thereto for 1 second, the electrochromic layer 15A provided blue coloration in accordance with shapes of the picture element electrodes. Then, after a negative electrode and a positive electrode were connected to the display electrode 12B and two picture element electrodes of the opposed electrode 14 in the electrochromic display element 20, respectively, and as a voltage of 6V was applied thereto for 1 second, the electrochromic layer 15B provided black coloration in accordance with shapes of the picture element electrodes. Moreover, as waiting for 30 minutes was conducted without applying a voltage, a damping rate of a coloration density was 40% and it was possible to confirm a sufficient retention property. Furthermore, black was not spread to a non-coloration part and image blur caused by a passage of time was not generated.

From the above precedings, it was found that it was possible for the electrochromic display element 20 in Practical Example 6 to be excellent in a retention property thereof and suppress generation of image blur caused by a passage of time.

APPENDIX

<An Illustrative Embodiment(s) of an Electrochromic Display Element and an Image Display Device>

At least one illustrative embodiment of the present invention may relate to an electrochromic display element and an image display device.

An object of at least one illustrative embodiment of the present invention may be to provide an electrochromic display element excellent in a retention property thereof and capable of suppressing generation of image blur caused by a passage of time.

At least one illustrative embodiment of the present invention may be an electrochromic display element that has a display substrate, a display electrode, an opposed substrate, an opposed electrode, and an electrochromic layer, wherein the electrochromic display element is characterized in that the electrochromic layer is formed on the display electrode, a liquid crystal composition that includes a low-molecular liquid crystal and an ionic liquid is present between the display electrode and the opposed electrode, and the ionic liquid includes a tetracyanoboric acid ion and/or tris(pentafluoroethyl)trifluorophosphoric acid ion as an anionic component.

Illustrative embodiment (1) is an electrochromic display element that has a display substrate, a display electrode, an electrochromic layer, an opposed electrode, and an opposed substrate, wherein the electrochromic display element is characterized in that the electrochromic layer is formed on the display electrode, a liquid crystal composition that includes a low-molecular liquid crystal and an ionic liquid is present between the display electrode and the opposed electrode, and the ionic liquid includes a tetracyanoboric acid ion and/or tris(pentafluoroethyl)trifluorophosphoric acid ion as an anionic component.

Illustrative embodiment (2) is the electrochromic display element as described in illustrative embodiment (1), characterized in that the liquid crystal composition does not include an organic solvent.

Illustrative embodiment (3) is the electrochromic display element as described in illustrative embodiment (1) or (2), characterized in that the low-molecular liquid crystal is a nematic liquid crystal.

Illustrative embodiment (4) is the electrochromic display element as described in any one of illustrative embodiments (1) to (3), characterized in that the low-molecular liquid crystal is such that a molecular weight thereof is less than or equal to 1000.

Illustrative embodiment (5) is the electrochromic display element as described in any one of illustrative embodiments (1) to (4), characterized in that the ionic liquid includes one kind or more than one kind selected from a group composed of an imidazolium ion, an N-methylpyrrolidinium ion, and an ammonium ion, as a cationic component.

Illustrative embodiment (6) is the electrochromic display element as described in any one of illustrative embodiments (1) to (5), characterized in that the electrochromic layer includes an electrically conductive or semiconductive particle with an organic electrochromic compound carried thereon.

Illustrative embodiment (7) is the electrochromic display element as described in any one of illustrative embodiments (1) to (6), characterized by having a plurality of the display electrodes and a plurality of the electrochromic layers, wherein each of the plurality of electrochromic layers is formed on each of the plurality of display electrodes, each of a plurality of stacks with the electrochromic layer formed on the display electrode is provided to be isolated between the display substrate and the opposed electrode, and the plurality of electrochromic layers are provided to be stacked.

Illustrative embodiment (8) is an image display device characterized by having the electrochromic display element as described in any one of illustrative embodiments (1) to (7).

According to at least one illustrative embodiment of the present invention, it may be possible to provide an electrochromic display element excellent in a retention property thereof and capable of suppressing generation of image blur.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of priority based on Japanese patent application No. 2013-052472 filed on Mar. 14, 2013, the entire content of which is herein incorporated by reference.

The invention claimed is:

1. An electrochromic display element, comprising a display substrate, a display electrode, an electrochromic layer, an opposed electrode, and an opposed substrate, wherein the electrochromic layer is formed on the display electrode, a liquid crystal composition that includes a low-molecular liquid crystal and an ionic liquid is present between the display electrode and the opposed electrode, and the ionic liquid includes a tetracyanoboric acid ion or tris(pentafluoroethyl)trifluorophosphoric acid ion or both as an anionic component.

2. The electrochromic display element as claimed in claim 1, wherein the liquid crystal composition does not include an organic solvent.

3. The electrochromic display element as claimed in claim 1, wherein the low-molecular liquid crystal is a nematic liquid crystal.

4. The electrochromic display element as claimed in claim 1, wherein the low-molecular liquid crystal is such that a molecular weight thereof is less than or equal to 1000.

5. The electrochromic display element as claimed in claim 1, wherein the ionic liquid includes one or more kinds selected from the group consisting of an imidazolium ion, an N-methylpyrrolidinium ion, and an ammonium ion, as a cationic component.

6. The electrochromic display element as claimed in claim 1, wherein the electrochromic layer includes an electrically conductive or semiconductive particle with an organic electrochromic compound carried thereon.

7. The electrochromic display element as claimed in claim 1, comprising a plurality of the display electrodes and a plurality of the electrochromic layers, wherein each of the plurality of electrochromic layers is formed on each of the plurality of display electrodes, each of a plurality of stacks with the electrochromic layer formed on the display electrode is provided to be isolated between the display substrate and the opposed electrode, and the plurality of electrochromic layers are provided to be stacked.

8. An image display device comprising the electrochromic display element as claimed in claim 1.

* * * * *